United States Patent
Zhang et al.

(10) Patent No.: US 10,112,841 B2
(45) Date of Patent: Oct. 30, 2018

(54) METHOD FOR CATALYTIC AMMONIA SYNTHESIS UNDER CONCENTRATED SOLAR ENERGY AND CATALYSTS

(71) Applicant: CENTRAL CHINA NORMAL UNIVERSITY, Wuhan, Hubei (CN)

(72) Inventors: Lizhi Zhang, Hubei (CN); Chengliang Mao, Hubei (CN); Falong Jia, Hubei (CN)

(73) Assignee: CENTRAL CHINA NORMAL UNIVERSITY, Wuhan, Hubei (CN)

( * ) Notice: Subject to any disclaimer, the term of this patent is extended or adjusted under 35 U.S.C. 154(b) by 51 days.

(21) Appl. No.: 15/370,379

(22) Filed: Dec. 6, 2016

(65) Prior Publication Data

US 2018/0037465 A1  Feb. 8, 2018

(30) Foreign Application Priority Data

Aug. 5, 2016 (CN) .......................... 2016 1 0639111

(51) Int. Cl.
*C01C 1/04* (2006.01)
*B01J 37/02* (2006.01)
(Continued)

(52) U.S. Cl.
CPC ........... *C01C 1/0411* (2013.01); *B01J 21/063* (2013.01); *B01J 23/462* (2013.01); *B01J 23/58* (2013.01);
(Continued)

(58) Field of Classification Search
CPC .... C01C 1/0405–1/0417; C01C 1/0482; B01J 35/0006; B01J 37/024; B01J 37/0236;
(Continued)

(56) References Cited

U.S. PATENT DOCUMENTS 4,568,532 A * 2/1986 Benner .................. B01J 8/0453
423/359

OTHER PUBLICATIONS

Akbayrak et al., "Ruthenium(0) nanoparticles supported on nanotitania as highly active and reusable catalyst in hydrogen generation from the hydrolysis of ammonia borane," International Journal of Hydrogen Energy 39 (2014) 2628-2637. (Year: 2014).*

* cited by examiner

*Primary Examiner* — Anthony J Zimmer
(74) *Attorney, Agent, or Firm* — Tim Tingkang Xia, Esq.; Locke Lord LLP

(57) ABSTRACT

A method for catalytic ammonia synthesis under concentrated solar energy and related catalysts. The method includes placing a catalyst in a reaction apparatus, feeding nitrogen and hydrogen into the reaction apparatus, and controlling a surface temperature of the catalyst to reach about 300° C. to 550° C. under irradiation of concentrated sunshine, to synthesize ammonia. The catalyst includes an amorphous and electron-rich black nano $TiO_{2-z}$ ($0<z<2$) with a disordered surface serves as a carrier material, and an elemental nano-crystal of Fe or Ru serves as an active ingredient. The active ingredient is loaded on the carrier material. Sunshine is used as the energy during ammonia synthesis reaction, and light in the whole wave band can be utilized sufficiently. Ammonia can be synthesized under solar energy with a high efficiency, and no fossil energy or electrical energy is needed. A synergetic catalytic effect of optical energy and thermal energy can be obtained.

10 Claims, 4 Drawing Sheets

(51) Int. Cl.
   *B01J 35/00*    (2006.01)
   *B01J 23/745*   (2006.01)
   *B01J 23/46*    (2006.01)
   *B01J 37/08*    (2006.01)
   *B01J 23/58*    (2006.01)
   *B01J 23/78*    (2006.01)
   *B01J 37/16*    (2006.01)
   *B01J 37/18*    (2006.01)
   *B01J 35/10*    (2006.01)
   *B01J 21/06*    (2006.01)
   *B01J 37/04*    (2006.01)

(52) U.S. Cl.
   CPC .............. *B01J 23/745* (2013.01); *B01J 23/78* (2013.01); *B01J 35/002* (2013.01); *B01J 35/0006* (2013.01); *B01J 35/006* (2013.01); *B01J 35/0013* (2013.01); *B01J 35/1014* (2013.01); *B01J 37/024* (2013.01); *B01J 37/0207* (2013.01); *B01J 37/0236* (2013.01); *B01J 37/04* (2013.01); *B01J 37/08* (2013.01); *B01J 37/16* (2013.01); *B01J 37/18* (2013.01); *C01C 1/0417* (2013.01); *C01C 1/0482* (2013.01)

(58) Field of Classification Search
   CPC ........ B01J 37/0207; B01J 37/04; B01J 37/18; B01J 37/16; B01J 23/58; B01J 23/78; B01J 21/063; B01J 35/0013
   See application file for complete search history.

METHOD FOR CATALYTIC AMMONIA SYNTHESIS UNDER CONCENTRATED SOLAR ENERGY AND CATALYSTS

CROSS-REFERENCE TO RELATED APPLICATION

This non-provisional application claims priority to and benefit of, under 35 U.S.C. § 119(a), Patent Application No. 201610639111.6 filed in P.R. China on Aug. 5, 2016, the entire content of which is hereby incorporated by reference.

FIELD OF THE INVENTION

The present disclosure relates to the technical field of ammonia synthesis and solar energy utilization, and particularly to a technology for catalytic ammonia synthesis with nitrogen and hydrogen under concentrated solar energy and related catalysts.

BACKGROUND OF THE INVENTION

Ammonia is an important chemical material and energy material. Nitrogen atoms are important constituent of biomolecules, and thus are essential component of medicaments and fertilizers. Moreover, nitrogen atoms are widely used in non-biological fields such as dyes, explosives, and resins. The synthesis of all these materials requires ammonia as the raw materials. Besides, ammonia is also an important energy material. Hydrogen is produced by the decomposition of ammonia, and therefore, ammonia is widely used as a hydrogen storage material.

Ammonia synthesis with nitrogen in air is considered to be the greatest scientific advance in $20^{th}$ century, and more than 1% of the total energy in the world is used for ammonia synthesis per year. At present, Haber-Bosch process is mainly used for artificial ammonia synthesis, which is a thermal catalytic technology. During the Haber-Bosch process, nitrogen and hydrogen serve as reaction gas, and reaction occurs under a high temperature and high pressure reaction condition with a Fe-based or Ru-based catalyst. However, during thermal catalysis procedure (with temperature ranging from 300° C. to 550° C., and pressure ranging from 15 megapascal (MPa) to 25 MPa), a large amount of fossil fuel needs to be consumed, and the burning of fossil fuel would result in greenhouse gas (carbon dioxide) emission. Facing the energy problem and environmental problem which draw increasingly attention throughout the world, energy conservation and emission reduction are always huge challenges in ammonia synthesis industry.

Solar energy is a renewable energy which is clean and cheap, and is the ultimate source of most energy in the world. There is a great application potential to utilize sunshine directly. Solar thermal effect is widely used in solar thermal power generation, solar water heater, and other industries in China. However, there is still a huge challenge to use sunshine for driving chemical reaction. According to the solar thermal catalytic technology which is developed in recent years, the optical wave in whole spectrum range of sunshine can be utilized effectively. That is, semiconductor can be excited by optical wave of high frequency wave band to generate photo carriers and realize photo-catalytic reaction, and at the same time, thermal reaction can be promoted by thermal energy generated during photo generated carriers recombination and thermal energy from optical wave of infrared wave band in the sunshine. In this manner, the solar energy utilization rate and the catalytic reaction efficiency can both be improved effectively. However, ammonia synthesis under normal pressure still remains challenging. Since in nitrogen, N—N triple bond is rather stable (the bond energy thereof is as high as 946 KJ/mol), and nitrogen cannot be activated by catalysts reported by related documents. Chinese patent (CN104016825A) discloses a Fe-containing or Ru-containing catalyst, which is used for producing organic fuel through carbon dioxide conversion, but cannot be used during ammonia synthesis reaction with nitrogen and hydrogen (the specific result thereof is shown in Table. 1).

Therefore, a technology through which solar energy can be absorbed and utilized effectively for catalyzing ammonia synthesis with nitrogen and hydrogen under solar energy is in demand. The technology has a great significance for both environment and energy, and the production cost of ammonia can be reduced. In a word, the technology has a bright commercial prospect.

SUMMARY OF THE INVENTION

With respect to the technical defect in the prior art, the present disclosure provides a method for catalytic ammonia synthesis with nitrogen and hydrogen under concentrated solar energy and a catalyst. According to the present disclosure, sunshine is used as the energy during ammonia synthesis reaction, and light in the whole wave band of sunshine can be utilized sufficiently. Ammonia can be synthesized under a catalytic effect of solar energy with a high efficiency, and no fossil energy or electrical energy is needed. The ammonia synthesis procedure under a catalytic effect of concentrated solar energy at normal pressure has a good performance, and a synergetic catalytic effect of optical energy and thermal energy can be obtained. With respect to the catalyst disclosed in the present disclosure, solar energy can be utilized effectively, and reaction temperature can be regulated freely in a range from 100° C. to 800° C., so that production requirement of ammonia synthesis can be met. Ammonia can be synthesized using the catalyst disclosed herein and with sunshine as the energy, and thus the technical problems that the intensive energy consumption during thermal catalytic procedure and the high cost thereof can be solved.

The technical solution of the present disclosure will be illustrated hereinafter.

A method for catalytic ammonia synthesis with nitrogen and hydrogen under concentrated solar energy, which comprises steps of placing a catalyst in a reaction apparatus and feeding nitrogen and hydrogen into the reaction apparatus, wherein a surface temperature of the catalyst reaches 300° C. to 550° C. under irradiation of concentrated sunshine, so that ammonia can be synthesized with nitrogen and hydrogen. Optical energy and thermal energy of sunshine can be concentrated to a surface of the catalyst through a converging method, whereby the technical problem that the energy density of sunshine is low can be solved so as to provide energy for ammonia synthesis reaction with nitrogen and hydrogen.

According to the above solution, in the catalyst, an amorphous and electron-rich black nano $TiO_{2-z}$ ($0<z<2$) with a disordered surface serves as a carrier material, and an elemental nano-crystal of Fe or Ru serves as an active ingredient. The active ingredient is loaded on the carrier material.

According to the above solution, in the catalyst, alkali metal or alkaline earth metal, i.e., potassium (K), rubidium (Rb), caesium (Cs), magnesium (Mg), calcium (Ca), strontium (Sr), or barium (Ba) serves as a promoter. The promoter is loaded on the carrier material. An atom ratio of the promoter to the active ingredient ranges from 10:1 to 1:100.

According to the above solution, the alkali metal or alkaline earth metal promoter is hydroxide, nitrate, carbonate, or bicarbonate of K, Rb, Cs, Mg, Ca, Sr, or Ba.

According to the above solution, a volume ratio of nitrogen to hydrogen is 1:3.

According to the above solution, a size of the active ingredient ranges from 1 nm to 20 nm.

According to the above solution, a specific surface area of the catalyst ranges from 50 $m^2/g$ to 100 $m^2/g$.

According to the above solution, the amorphous and electron-rich black nano $TiO_{2-z}$ ($0<z<2$) with a disordered surface is produced through the following steps: mixing nano $TiO_2$ and sodium borohydride (a mass ratio thereof ranging from 1:0.5 to 1:8), grinding the mixture to be uniform, heating the mixture in a closed Muffle furnace to 370° C. to 420° C., taking the mixture out and quenching, and obtaining the carrier material $TiO_{2-z}$ ($0<z<2$) through post-treatments. The post-treatments comprise washing with water for multiple times, and low temperature drying.

According to the above solution, when the active ingredient is an elementary substance of Fe, a use amount thereof accounts for 5 wt % to 50 wt % of the carrier material; and when the active ingredient is an elementary substance of Ru, a use amount thereof accounts for 1 wt % to 8 wt % of the carrier material.

A catalyst is provided, in the catalyst, an amorphous and electron-rich black nano $TiO_{2-z}$ ($0<z<2$) with a disordered surface serves as a carrier material, and an elemental nanocrystal of Fe or Ru serves as an active ingredient. The active ingredient is loaded on the carrier material.

According to the above solution, in the catalyst, alkali metal or alkaline earth metal, i.e., K, Rb, Cs, Mg, Ca, Sr, or Ba serves as a promoter. The promoter is loaded on the carrier material. An atom ratio of the promoter to the active ingredient ranges from 10:1 to 1:100.

According to the above solution, the alkali metal or alkaline earth metal promoter is hydroxide, nitrate, carbonate, or bicarbonate of K, Rb, Cs, Mg, Ca, Sr, or Ba.

According to the above solution, when using an elementary Fe as active ingredient, a use amount thereof accounts for 5 wt % to 50 wt % of the carrier material; and when the active ingredient is an elementary Ru, a use amount thereof accounts for 1 wt % to 8 wt % of the carrier material.

According to the above solution, a size of the active ingredient ranges from 1 nm to 20 nm.

According to the above solution, a specific surface area of the catalyst ranges from 50 $m^2/g$ to 100 $m^2/g$.

According to the above solution, the amorphous and electron-rich black nano $TiO_{2-z}$ ($0<z<2$) with a disordered surface is produced through the following steps: mixing nano $TiO_2$ and sodium borohydride (a mass ratio thereof ranging from 1:0.5 to 1:8), grinding the mixture to be uniform, heating the mixture in a closed Muffle furnace to 370° C. to 420° C., taking the mixture out and quenching, and obtaining the carrier material $TiO_{2-z}$ ($0<z<2$) through post-treatments. The post-treatments comprise washing with water for multiple times, and low temperature drying.

A method for producing the aforesaid catalyst, wherein an impregnation method, high-temperature hydrogen reduction or liquid phase reduction, and promoter loading method is used, i.e., loading the active ingredient on a substrate material, obtaining active ingredient/$TiO_{2-z}$ through high-temperature hydrogen reduction or liquid phase reduction, and loading the promoter thereon according to actual needs, comprising following specific steps:

mixing nano $TiO_2$ and sodium borohydride (a mass ratio thereof ranging from 1:0.5 to 1:8), grinding the mixture to be uniform, heating the mixture in a closed Muffle furnace to 370° C. to 420° C., taking the mixture out and quenching, and obtaining the carrier material $TiO_{2-z}$ ($0<z<2$) through post-treatments; and impregnating the carrier material into a precursor solution of Fe or Ru with a certain amount, drying after ultrasonic mixing, obtaining active ingredient/$TiO_{2-z}$ through high-temperature hydrogen reduction or liquid phase reduction of the sample, and impregnating the sample obtained therein into an promoter solution so as to obtain a catalyst sample after drying in an oxygen-free atmosphere or in vacuum.

According to the above solution, the precursor of Fe or Ru is chloride, nitrate, or carbonyl compound of Fe or Ru, and water, acetone, or tetrahydrofuran is used as solvent to prepare the solution. When the precursor is chloride of Fe or Ru, the precursor sample is washed with deionized water for multiple times after reduction, and then dried, so as to fully remove chlorine ions.

According to the above solution, when the high-temperature hydrogen reduction method is used, sunshine is used as the energy, and the active ingredient is reduced in the catalytic apparatus by the ammonia synthesis reaction atmosphere. That is, placing the carrier material that is impregnated with the active ingredient precursor in the reactor, concentrating solar energy so that the surface temperature of the catalyst reaches 300° C. to 550° C., and feeding the raw gas of ammonia synthesis reaction, i.e., the mixture of nitrogen and hydrogen, or hydrogen into the reactor, so as to obtain the active ingredient/$TiO_{2-z}$ catalyst after reduction. The reduction time is generally ranges from 0.1 hour to 2 hours.

According to the above solution, when the liquid phase reduction method is used, $NaBH_4$ is used as reducing agent, and the reduction time is generally ranges from 2 hours to 8 hours.

According to the above solution, the promoter solution is ethanol solution or ethylene glycol solution of the promoter. The sample that is impregnated with the promoter solution is placed in the reaction apparatus, and the raw gas of ammonia synthesis reaction, i.e., the mixture of nitrogen and hydrogen, or nitrogen is fed into the reaction apparatus. Then, the sample is dried under the irradiation of concentrated sunshine.

The following advantages can be brought about according to the present disclosure.

First, the catalytic procedure is environment-friendly, and has a low cost and a high efficiency. According to the present disclosure, light in the whole wave band of sunshine can be utilized sufficiently. Ammonia can be synthesized under a catalytic effect of solar energy with a high efficiency, and no fossil energy or electrical energy is needed. The catalytic process is a totally new Haber-Bosch process under the catalytic effect of solar energy, and is an innovative upgrading for traditional Haber-Bosch process, which is a heat catalytic process. The ammonia synthesis procedure under a catalytic effect of concentrated solar energy at normal pressure has a good performance, and the production capacity of ammonia can reach 32.2 ml/(per gram of catalyst*hour). A synergetic catalytic effect of optical energy and thermal energy can be obtained.

Second, the substrate material can promote the light absorption thereof and can raise activity of the active ingredient. According to the present disclosure, the electron-rich, and non-stoichiometric compound $TiO_{2-z}$ with a disordered surface serves as the substrate, whereby with respect to the catalyst, the utilization ratio of sunshine can be improved. Meanwhile, because of the disordered surface of the substrate and the oxygen vacancies existed therein, the loading of active ingredient, the uniform dispersing thereof, and the mutual action between active ingredient and the substrate can all be improved. Therefore, the catalyst disclosed herein has the activity during ammonia synthesis procedure which traditional catalyst does not have.

Third, the catalytic reaction occurs under concentrated sunshine, and the activity of the catalyst can be stabilized by the promoter. The disordered structure of the catalyst is a guarantee of the catalytic performance thereof, but recrystallization would easily occur at a high temperature, which is harmful to the maintenance of the disordered structure. According to the present disclosure, the catalyst has a high solar thermal conversion ability. The surface temperature of the catalyst can rise rapidly under the irradiation of sunshine, and can drop rapidly without light irradiation. The oxygen vacancies can be maintained stable in the material in a hydrogen atmosphere. Due to rapid temperature change of the catalyst and the maintenance of the oxygen vacancies in the material, the regeneration and circulation of the disordered structure can be realized. The alkali metal and alkaline earth metal promoter can not only promote the performance of the catalyst from its electronic structure, but also play the role of structural promoter, so that the disordered structure of the substrate material can be maintained in a stable state. Since the disordered structure of the substrate can be maintained in a stable state, the active ingredient can also be maintained in a stable state, and the activity of the catalyst can be stabilized accordingly.

In a word, with respect to the catalyst disclosed herein, the optical wave in whole spectrum range of sunshine (0.2 μm to 2.5 μm) can be utilized effectively. The catalyst shows a high solar thermal conversion ability and a good ammonia synthesis performance. The optical energy and thermal energy of sunshine can be concentrated to the surface of the catalyst through a converging method so as to provide driving force for ammonia synthesis reaction with nitrogen and hydrogen. In this manner, ammonia can be synthesized at normal pressure. Moreover, since the reaction occurs under a catalytic effect of concentrated solar energy, the synergetic catalytic effect of optical energy and thermal energy can be obtained, which shows a better performance than traditional thermal catalysis at a same temperature. The nano $TiO_{2-z}$ with a disordered surface serves as the substrate material, whereby not only the utilization ratio of sunshine can be improved, but also the catalytic ability of the active ingredient can be increased and stabilized. The structure of the catalyst can be maintained by the rapid temperature rising and dropping ability thereof, and thus the performance of the catalyst can be stabilized. Since during the reduction procedure of the active ingredient of the catalyst and during the catalytic procedure of ammonia synthesis reaction, the concentrated sunshine is used as the energy, the whole procedure has a low energy consumption. Therefore, the procedure is clean and environment-friendly. The energy conservation and emission reduction problem which the ammonia synthesis industry faces can be solved. The method disclosed herein would possibly become the technology of next generation in the ammonia synthesis industry, and has a bright commercial prospect.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
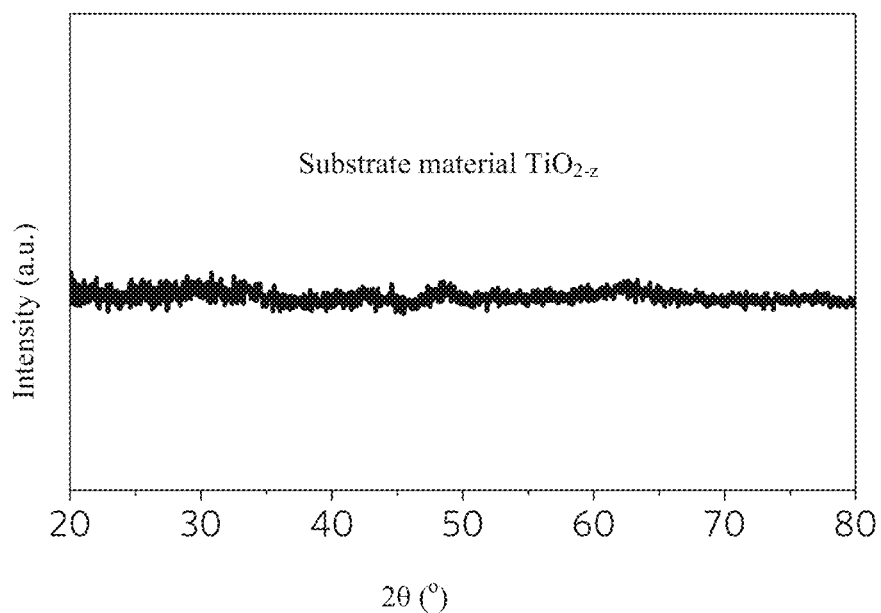
FIG. 1 is an X-Ray diffraction pattern of $TiO_{2-z}$.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-7. In accordance with the purposes of this invention, as embodied and broadly described herein, this invention, in one aspect, relates to a technology for catalytic ammonia synthesis with nitrogen and hydrogen under concentrated solar energy and related catalysts.

Embodiment 1

The present embodiment shows the manufacturing of a catalyst with alkali metal or alkaline earth metal as promoter, and with Ru as active ingredient, which is loaded on black $TiO_{2-z}$ and the synthesizing of ammonia under a catalytic effect of concentrated sunshine.

Figure 2:
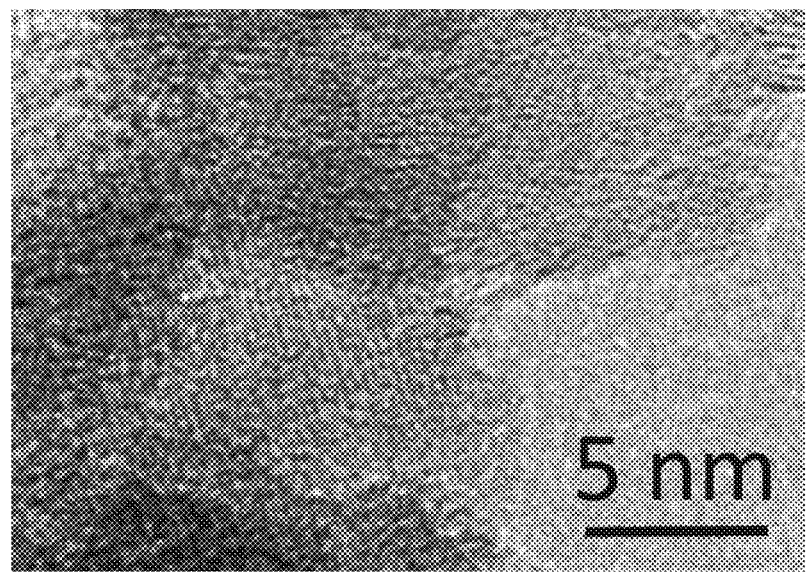
FIG. 2 is a high resolution transmission electron microscope picture of $TiO_{2-z}$.
Figure 3:
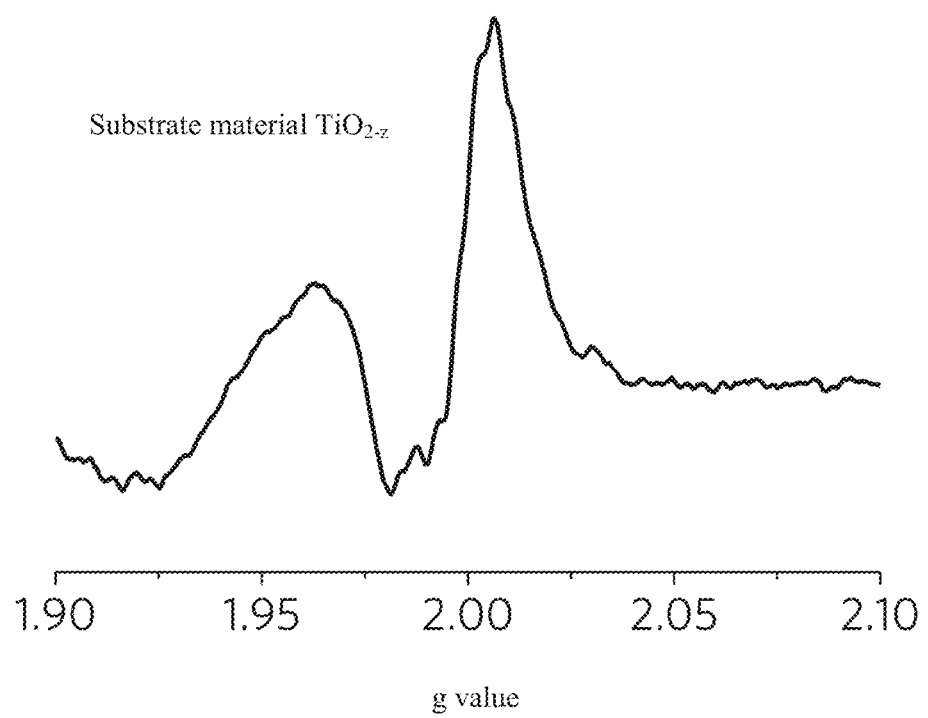
FIG. 3 is an electron paramagnetic resonance spectrum of $TiO_{2-z}$, wherein g is an electron paramagnetic resonance factor.

Nano titanium oxide (1 g) and sodium borohydride (2 g) are ground fully and mixed together. The mixture is placed in a Muffle furnace, in which the temperature is raised to 370° C. at a speed of 10° C./min. The crucible is taken out of the Muffle furnace at 370° C., and is put in an air environment at room temperature so that the temperature thereof drops rapidly. The solid product is placed in a beaker, and 100 ml deionized water is added to the beaker. Then, the beaker stays for 1 hour. The solid obtained therein is filtered and is washed with deionized water. The solid is dried in a vacuum drying oven at 100° C. for 4 hours, so that the carrier, i.e., black $TiO_{2-z}$ solid can be obtained. An X-Ray diffraction spectrum of the carrier $TiO_{2-z}$ is shown in FIG. 1. There is no apparent peak in the X-Ray diffraction spectrum, which shows that the material has a poor crystallinity or has no crystallinity. A high resolution transmission electron microscope picture of the carrier $TiO_{2-z}$ is shown in FIG. 2. It can be seen from the disordered lattice fringes in FIG. 2 that, the crystallinity of the material is poor, and the material is in a disordered state on the whole. An electron paramagnetic resonance spectrum of the carrier material is shown in FIG. 3. As shown in FIG. 3, there is a peak at g being about 2.0, which shows that the material contains abundant oxygen vacancies. Because of the disordered structure of the carrier material and the oxygen vacancies contained therein, the carrier material is electron-rich.

Figure 4:
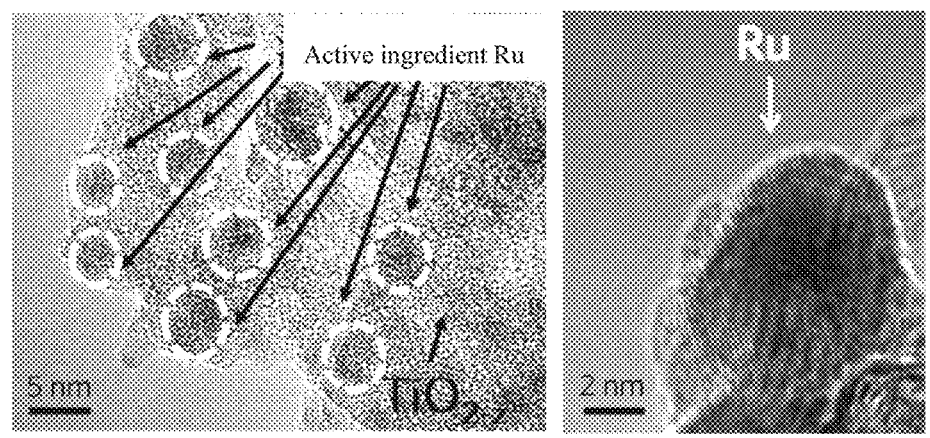
FIG. 4 shows transmission electron microscope pictures of ammonia synthesis catalyst $Ru/TiO_{2-z}$, wherein the left picture shows that Ru nano particles are loaded on the carrier $TiO_{2-z}$ uniformly, and the right picture shows one single Ru nano particle.

Black $TiO_{2-z}$ carrier (1 g) and a prepared tetrahydrofuran solution or acetone solution of triruthenium dodecacarbonyl, which is 3 wt % (changing in a range from 1 wt % to 8 wt %) of the carrier material measuring by Ru element, are mixed and dried. The black solid obtained therein is dried in vacuum in a tube furnace for 1 hour. The solid is placed in a reactor, and the catalyst is reduced for 1 hour in a hydrogen atmosphere ($N_2:H_2$ being 1:3, and a volume flow thereof being 10 ml/min) with a surface temperature of the catalyst at about 400° C. under concentrated sunshine. In this manner, the Ru/$TiO_{2-z}$ catalyst can be obtained, and the catalyst shows a black color or a dark gray color. FIG. 4 shows transmission electron microscope pictures of Ru/$TiO_{2-z}$ ammonia synthesis catalyst, wherein a left picture shows that Ru nano particles are loaded on the carrier $TiO_{2-z}$ uniformly, and a right picture shows one single Ru nano particle. It can be seen through a transmission electron microscope that, a size of the Ru particle ranges from 1 nm to 20 nm.

The above prepared Ru/$TiO_{2-z}$ catalyst (1 g), and ethanol solution of KOH (an atom ratio of the promoter to the active ingredient ranges from 10:1 to 1:100) are mixed fully and placed in a reactor. The mixture is dried under concentrated sunshine in an inert atmosphere (nitrogen or mixture of nitrogen and hydrogen, 20 ml/min) at about 100° C. The sample obtained therein is the ammonia synthesis catalyst, and a specific surface area of the catalyst is 84 $m^2/g$.

A catalyst in which Ru is loaded on $TiO_{2-z}$ can also be produced by aqueous solution of $RuCl_3$ or $Ru(NO_3)_3$. When a precursor containing Cl is used, the catalyst produced therein should be washed with deionized water for multiple times so as to remove the Cl ions, and dried in vacuum or dried in an inert atmosphere under concentrated sunshine. Then, the promoter is loaded on the catalyst. Aqueous solution, ethanol solution or ethylene glycol solution of hydroxide, nitrate, carbonate, or bicarbonate of K, Rb, Cs, Mg, Ca, Sr, or Ba can also be used as the promoter, and thus catalyst with different kinds of promoter can be produced.

The ammonia synthesis experiment will be illustrated hereinafter.

A catalyst is placed in a reactor, and nitrogen and hydrogen (a volume ratio of nitrogen and hydrogen being 1:3) is fed into the reactor, wherein a surface temperature of the catalyst reaches a predetermined temperature under irradiation of concentrated sunshine, so that ammonia can be synthesized with nitrogen and hydrogen. A volume flow of the reaction gas ($N_2:H_2$ being 1:3) is 6 ml/min, and a use amount of the catalyst is 0.1 g.

A catalyst with Fe or Ru as active ingredient is reported by related document, but the catalyst has no catalytic effect in ammonia synthesis reaction. The specific result is shown in Table 1.

According to the present disclosure, the use amount of the precursor can be adjusted during the producing of catalyst, so that catalyst with different active ingredient content can be obtained. Specifically, a use amount of Ru accounts for 1 wt % to 8 wt % of the carrier material. The influence of different Ru loading amount on the reaction activity of the catalyst is shown in Table 2. As shown in Table 2, when the loading amount of the active ingredient Ru is increased, the reaction activity of the catalyst is increased accordingly.

The promoter used in the catalyst can be changed, and thus catalyst with different kinds of promoter can be obtained. The influence of different kinds of promoter on the reaction activity of the catalyst is shown in Table 3. As shown in Table 3, the promoting order of different kinds of promoter on the catalytic performance of the catalyst is Rb>Ba>Cs>K>Sr>Ca>Mg>without promoter.

The loading amount of the active ingredient does not change, and the using amount of promoter is adjusted. The influence of different amount of promoter on the activity of the catalyst is shown in Table 4. As shown in Table 4, when the using amount of promoter is increased, the reaction activity of the catalyst is increased accordingly.

The influence of temperature on the catalytic activity of the catalyst is shown in Table. 5. As shown in Table. 5, with respect to one catalyst, when the reaction temperature rises, the catalytic activity of the catalyst increases.

In order to research lifetime of the catalyst, circular experiment is performed for 6 times with K/3% Ru/$TiO_{2-z}$ (K:Ru being 1:1) as the catalyst, and each experiment occurs for 7 hours. The experiment result is shown in Table 6. It can be seen from Table 6 that, the circular performance of the catalyst is good under the reaction condition.

In order to compare the performance of concentrated sunshine catalysis with traditional heat catalysis, the ammonia synthesis comparative experiment is performed with different kinds of catalysts, i.e., the concentrated sunshine catalyst with K as promoter (K:Ru being 1:1), and Ru (Ru accounting for 3 wt % of the carrier material) being loaded on black $TiO_{2-z}$, and the traditional catalyst being loaded on $Al_2O_3$, MgO, and activated carbon respectively. The result is shown in Table 7, which shows that the ammonia synthesis effect of the catalyst under concentrated sunshine according to the present disclosure is apparently better than that of the traditional heat catalyst.

Figure 5:
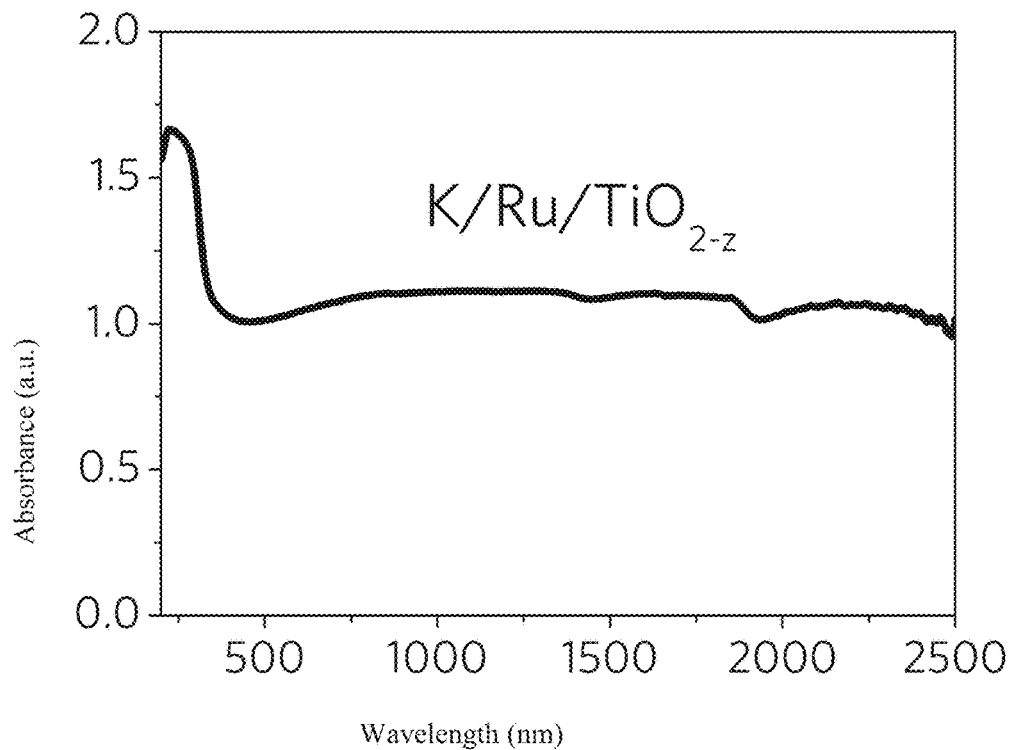
FIG. 5 is a near infrared-visible light-ultraviolet absorption spectrum of $K/Ru/TiO_{2-z}$ ammonia synthesis catalyst.
Figure 6:
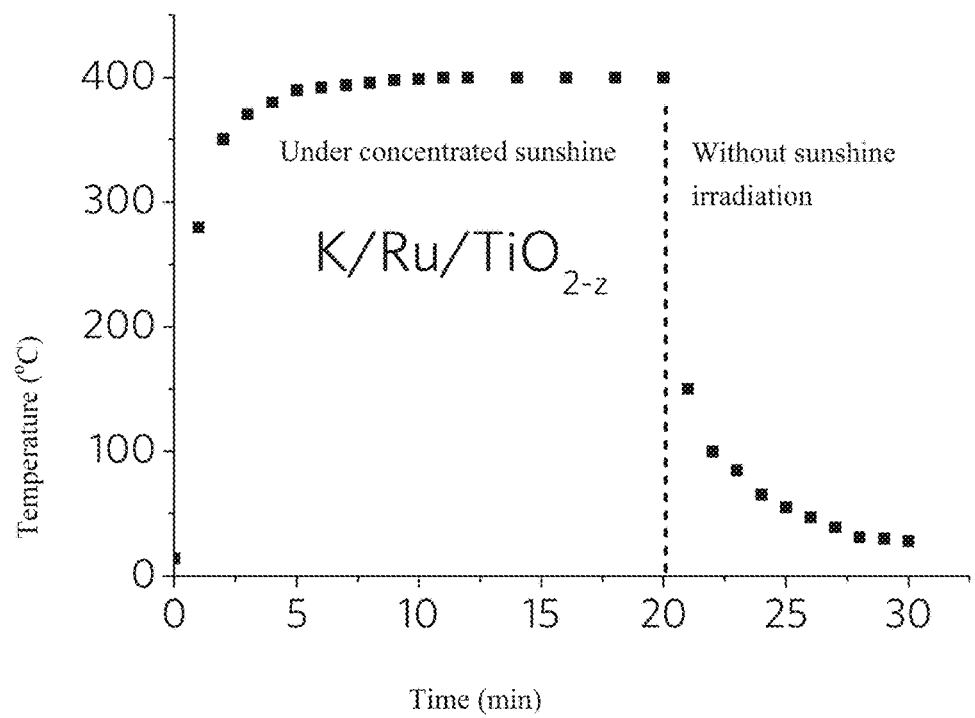
FIG. 6 schematically shows a temperature rising curve of $K/Ru/TiO_{2-z}$ ammonia synthesis catalyst under concentrated sunshine and a temperature dropping curve thereof without sunshine irradiation.
Figure 7:
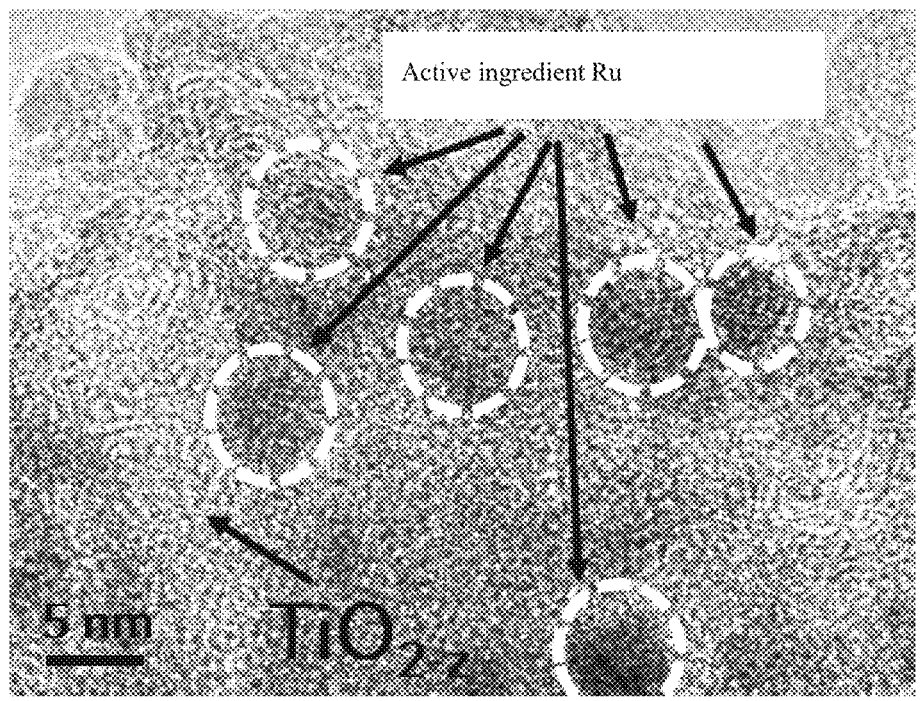
FIG. 7 is a transmission electron microscope picture of $K/Ru/TiO_{2-z}$ after 6 times of circular reaction.

The catalyst prepared according to the above steps has a black color or a dark gray color. A specific surface area of the catalyst ranges from 50 $m^2/g$ to 100 $m^2/g$. The catalyst can absorb infrared, visible light, and ultraviolet of sunshine, and a near infrared-visible light-ultraviolet absorption spectrum of K/3% Ru/$TiO_{2-z}$ (K:Ru being 1:1) is shown in FIG. 5. A surface temperature of the catalyst can rise to 300° C. to 500° C. within 1 to 3 minutes under concentrated sunshine, and the requirement for temperature during ammonia synthesis reaction can be met. The black $TiO_{2-z}$ is an electron-rich material with a disordered surface, and the disordered surface can provide sites for Ru loading, whereby Ru can be dispersed in the carrier material in a uniform manner. After Ru is loaded thereon, since Ru can contact with Schottky of the substrate, electrons in the black $TiO_{2-z}$ can transfer to Ru. Therefore, the catalyst has a high activity during ammonia synthesis reaction. However, the catalyst that is reported by related document does not have a catalytic effect during ammonia synthesis reaction (the result is shown in Table 1). FIG. 6 schematically shows a temperature rising curve of the catalyst under concentrated sunshine and a temperature dropping curve thereof without sunshine irradiation. It can be seen from FIG. 6 that, the temperature of the catalyst according to the present disclosure can rise rapidly under concentrated sunshine so as to meet the requirement for temperature during ammonia synthesis reaction, and the temperature thereof can drop rapidly without sunshine irradiation. The disordered structure of $TiO_{2-z}$ can be maintained due to $TiO_{2-z}$ being reduced in hydrogen atmosphere under light excitation, the rapid temperature rising of the catalyst under light irradiation, rapid temperature dropping thereof without light irradiation, and the promoter contained therein. Therefore, the catalyst has a relatively long lifetime. The specific result is shown in FIG. 7. It can be seen through the transmission electron microscope picture that, the carrier material $TiO_{2-z}$ still has a disordered surface after 6 times of circular reaction. The particle size of the active ingredient Ru does not change apparently compared with the sample before reaction (as shown in FIG. 2), which shows that the carrier material has a good stability and thus the catalyst has a long lifetime.

TABLE 1

Ammonia synthesis performance of catalyst containing Fe or Ru active ingredient reported by related document

| Catalyst | Loading amount of active ingredient (%) | Related document | Activity [ml ammonia/(per gram of catalyst * hour)] |
| --- | --- | --- | --- |
| $FeO_x/Al_2O_3$ (x = 0~2) | 2.5 | Patent CN104016825A | 0 (410° C.) |
| $RuO_y/TiO_2$ (y = 0~3) | 2.5 | Patent CN104016825A | 0 (400° C.) |

TABLE 2

The influence of Ru loading amount on ammonia synthesis performance of catalyst with K as promoter under concentrated sunshine

| Catalyst (K:Ru = 1:1) | Ru loading amount (wt %) | Activity [ml ammonia/(per gram of catalyst * hour)] (400° C.) |
| --- | --- | --- |
| $K/Ru/TiO_{2-z}$ | 1 | 0.9 |
| | 2.5 | 2.9 |
| | 3 | 3.5 |
| | 5 | 5.0 |
| | 8 | 7.5 |

TABLE 3

Ammonia synthesis performance of catalyst with alkali metal or alkaline earth metal as promoter, and Ru being loaded on black $TiO_{2-z}$ (Ru being 3 wt % of the carrier material) under concentrated sunshine and influence of different promoters on activity of the catalyst

| Promoter | Promoter:Ru (atom ratio) (Ru loading amount 3 wt %) | Activity [ml ammonia/(per gram of catalyst * hour)] (400° C.) |
| --- | --- | --- |
| Rb | 1:1 | 5.6 |
| Ba | 1:1 | 4.9 |
| Cs | 1:1 | 4.5 |
| K | 1:1 | 3.5 |
| Sr | 1:1 | 3.0 |
| Ca | 1:1 | 1.7 |
| Mg | 1:1 | 1 |
| Without promoter | 0 | 0.5 |

TABLE 4

The influence of atom ratio of K to active ingredient Ru on ammonia synthesis performance of catalyst with alkali metal K as promoter under concentrated sunshine

| Catalyst (Ru loading amount 3 wt %) | K:Ru (atom ratio) | Activity [ml ammonia/(per gram of catalyst * hour)] (400° C.) |
| --- | --- | --- |
| $K/Ru/TiO_{2-z}$ | 10:1 | 24.2 |
| | 5:1 | 6.8 |
| | 1:1 | 3.5 |
| | 1:100 | 0.6 |

TABLE 5

The influence of temperature on activity of the catalyst with alkali metal K as promoter (K:Ru being 1:1) and Ru being loaded on black $TiO_{2-z}$ (Ru being 3 wt % of the carrier material)

| Catalyst (Ru loading amount 3 wt %, K:Ru being 1:1) | Reaction temperature | Activity [ml ammonia/(per gram of catalyst * hour)] |
| --- | --- | --- |
| $K/Ru/TiO_{2-z}$ | 520 | 5.8 |
| | 400 | 3.5 |
| | 300 | 0.8 |

TABLE 6

Ammonia synthesis circular experiments of the catalyst with alkali metal K as promoter (K:Ru being 1:1) and Ru being loaded on black $TiO_{2-z}$ (Ru being 3 wt % of the carrier material) under concentrated sunshine

| | Activity [ml ammonia/(per gram of catalyst * hour)] (400° C.) (activity being average value during 7 hours) Times (each experiment goes on for 7 hours) | | | | | |
| --- | --- | --- | --- | --- | --- | --- |
| Catalyst | First | Second | Third | Fourth | Fifth | Sixth |
| $K/Ru/TiO_{2-z}$ (Ru loading amount 3 wt %, K:Ru being 1:1) | 3.5 | 3.7 | 3.4 | 3.6 | 3.7 | 3.5 |

TABLE 7

Comparative experiments of ammonia synthesis reaction of the catalyst with alkali metal K as promoter (K:Ru being 1:1) and Ru being loaded on black $TiO_{2-z}$ (Ru being 3 wt % of the carrier material) under concentrated sunshine and traditional heat catalyst that is loaded on $Al_2O_3$, MgO, and activated carbon respectively

| Catalyst (Ru loading amount 3 wt %, K:Ru being 1:1) | $K/Ru/TiO_{2-x}$ Concentrated sunshine catalysis | $K/Ru/Al_2O_3$ Heat catalysis | K/Ru/MgO Heat catalysis | K/Ru/activated carbon Heat catalysis |
|---|---|---|---|---|
| Activity [ml ammonia/(per gram of catalyst * hour)] (400° C.) | 3.5 | 0.1 | 0.9 | 1.8 |

Embodiment 2

The present embodiment shows the manufacturing of a catalyst with alkali metal or alkaline earth metal as promoter, and with Fe as active ingredient, which is loaded on black $TiO_{2-z}$, and the synthesizing of ammonia under a catalytic effect of concentrated sunshine.

Nano titanium oxide (1 g) and sodium borohydride (1.5 g) are ground fully and mixed together. The mixture is placed in a Muffle furnace, in which the temperature is raised to 410° C. at a speed of 10° C./min. The crucible is taken out of the Muffle furnace at 410° C., and is put in an air environment at room temperature so that the temperature thereof drops rapidly. The solid product is placed in a beaker, and 100 ml deionized water is added to the beaker. Then, the beaker stays for 1 hour. The solid obtained therein is filtered and is washed with deionized water. The solid is dried in a vacuum drying oven at 100° C. for 4 hours, so that the carrier, i.e., black $TiO_{2-z}$ solid can be obtained. The $TiO_{2-z}$ is an amorphous and electron-rich material, which has a disordered surface and contains oxygen vacancies therein.

Black $TiO_{2-z}$ carrier (1 g) and a prepared aqueous solution of ferric chloride, which is 30 wt % (changing in a range from 5 wt % to 50 wt %) of the carrier material, are mixed and added into a beaker. The mixture is dried by an infrared light in a nitrogen atmosphere, and the solid obtained therein is compacted in a mortar and ground fully. The solid is placed in a reactor and maintained for 1 hour in an inert atmosphere with a surface temperature of the catalyst at about 350° C. under concentrated sunshine. Then, the solid is reduced. There are two reduction methods. First, high-temperature hydrogen reduction method: the solid obtained therein is reduced for 1 hour in a hydrogen atmosphere ($N_2:H_2$ being 1:3, and a volume flow thereof being 20 ml/min) with a surface temperature thereof at about 320° C. under concentrated sunshine; and the product is suction filtered and cleaned with deionized water and ethanol after cooling, and dried by an infrared light in an inert atmosphere. Second, liquid phase reduction method: the solid (1 g) obtained therein is added to aqueous solution of $NaBH_4$ (6 g sodium borohydride is dissolved in 1 L water), and the solution stays for 2 hours; and the solution is filtered and washed fully so as to remove Cl ions, and dried in vacuum or by an infrared light in a nitrogen atmosphere so as to obtain $Fe/TiO_{2-z}$ catalyst.

Ethanol solution of KOH (an atom ratio of the promoter to the active ingredient ranges from 10:1 to 1:100) is prepared. The promoter and the catalyst are mixed fully and placed under concentrated sunshine. The sample is dried by an infrared light in an inert atmosphere (nitrogen or mixture of nitrogen and hydrogen, 20 ml/min). The sample obtained therein is the ammonia synthesis catalyst $K/Fe/TiO_{2-z}$, and a specific surface area of the catalyst is 62 $m^2/g$.

According to the above method, a catalyst in which Fe is loaded on $TiO_{2-z}$ can also be produced by aqueous solution of $FeCl_3$ or $Fe(NO_3)_3$. When a precursor containing Cl is used, the catalyst produced therein should be washed with deionized water for multiple times so as to remove the Cl ions, and dried in vacuum or dried in an inert atmosphere under concentrated sunshine. Then, the promoter is loaded on the catalyst. Aqueous solution, ethanol solution or ethylene glycol solution of hydroxide, nitrate, carbonate, or bicarbonate of K, Rb, or Cs can also be used as the promoter, and thus catalyst with different kinds of promoter can be produced. The influence of Fe loading amount on catalytic performance of the catalyst is shown in Table 8. The ammonia synthesis effect of catalysts with different kinds of promoter is shown in Table 9. The influence of the content of promoter K on catalytic performance of the catalyst is shown in Table 10.

The catalyst prepared according to the above steps has a black color. The catalyst can absorb infrared, visible light, and ultraviolet of sunshine. A surface temperature of the catalyst can rise to 300° C. to 500° C. within 1 to 3 minutes under concentrated sunshine, and the requirement for temperature during ammonia synthesis reaction can be met. The black $TiO_{2-z}$ is an electron-rich material with a disordered surface, and the disordered surface can provide sites for Fe loading. In this manner, electrons in the black $TiO_{2-z}$ can transfer to Fe, and thus the catalyst has a high activity during ammonia synthesis reaction. The disordered structure of $TiO_{2-z}$ can be maintained due to $TiO_{2-z}$ being reduced in hydrogen atmosphere under light excitation, rapid temperature dropping of the catalyst without light irradiation, and the promoter contained therein. Therefore, the catalyst has a relatively long lifetime.

TABLE 8

The influence of Fe loading amount on ammonia synthesis performance of catalyst with K as promoter

| Catalyst (promoter:Fe = 1:10) | Fe loading amount (wt %) | Activity [ml ammonia/ (per gram of catalyst * hour)] (400° C., space velocity 3600 per hour) |
|---|---|---|
| $K/Fe/TiO_{2-z}$ | 5 | 0.8 |
| | 10 | 2.8 |
| | 30 | 9 |
| | 50 | 17 |

TABLE 9

Ammonia synthesis performance of catalyst with alkali metal or alkaline earth metal as promoter, and Fe being loaded on black $TiO_{2-z}$ as active ingredient under concentrated sunshine

| Promoter | Promoter:Fe (atom ratio) (Fe loading amount 30 wt %) | Activity [ml ammonia/ (per gram of catalyst * hour)] (400° C., space velocity 3600 per hour) |
|---|---|---|
| Rb | 1:10 | 13.5 |
| Cs | 1:10 | 11.4 |
| K | 1:10 | 9 |
| Without promoter | 0 | 1.2 |

TABLE 10

The influence of promoter content on ammonia synthesis performance of 30% Fe/$TiO_{2-x}$ catalyst with alkali metal K as promoter

| Catalyst (Fe loading amount 30 wt %) | K:Fe (atom ratio) | Activity [ml ammonia/ (per gram of catalyst * hour)] (400° C., space velocity 3600 per hour) |
|---|---|---|
| K/Fe/$TiO_{2-z}$ | 10:1 | 32.2 |
| | 1:10 | 9 |
| | 1:100 | 1.4 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for catalytic ammonia synthesis with nitrogen and hydrogen under concentrated solar energy, comprising:
    placing a catalyst in a reaction apparatus;
    feeding nitrogen and hydrogen into the reaction apparatus; and
    controlling a surface temperature of the catalyst to reach about 300° C. to 550° C. under irradiation of concentrated sunshine, so that ammonia can be synthesized with nitrogen and hydrogen,
    wherein the catalyst comprises an amorphous and electron-rich black nano $TiO_{2-z}$ (0<z<2) with a disordered surface serves as a carrier material, and an elemental nano-crystal of Fe or Ru serves as an active ingredient; and wherein the active ingredient is loaded on the carrier material.

2. The method according to claim 1, wherein the catalyst further comprises a promoter loaded on the carrier material, the promoter comprises alkali metal or alkaline earth metal of K, Rb, Cs, Mg, Ca, Sr, or Ba, and an atom ratio of the promoter to the active ingredient ranges from 10:1 to 1:100.

3. The method according to claim 2, wherein the promoter is hydroxide, nitrate, carbonate, or bicarbonate of K, Rb, Cs, Mg, Ca, Sr, or Ba.

4. The method according to claim 1, wherein a volume ratio of nitrogen to hydrogen is 1:3.

5. The method according to claim 1,
    wherein when the active ingredient is an elementary substance of Fe, a use amount thereof accounts for 5 wt % to 50 wt % of the carrier material; and
    wherein when the active ingredient is an elementary substance of Ru, a use amount thereof accounts for 1 wt % to 8 wt % of the carrier material.

6. A catalyst comprising an amorphous and electron-rich black nano $TiO_{2-z}$ (0<z<2) with a disordered surface serves as a carrier material, and an elemental nano-crystal of Fe or Ru serves as an active ingredient, wherein the active ingredient is loaded on the carrier material.

7. The catalyst according to claim 6,
    wherein when the active ingredient is an elementary substance of Fe, a use amount thereof accounts for 5 wt % to 50 wt % of the carrier material; and
    wherein when the active ingredient is an elementary substance of Ru, a use amount thereof accounts for 1 wt % to 8 wt % of the carrier material.

8. The catalyst according to claim 6, further comprising a promoter loaded on the carrier material, wherein the promoter comprises alkali metal or alkaline earth metal of K, Rb, Cs, Mg, Ca, Sr, or Ba, and an atom ratio of the promoter to the active ingredient ranges from 10:1 to 1:100.

9. A method for producing the catalyst according to claim 6, comprising:
    mixing nano $TiO_2$ and sodium borohydride with a mass ratio thereof ranging from 1:0.5 to 1:8 to form a mixture, grinding the mixture to be uniform, heating the mixture in a closed Muffle furnace to 370° C. to 420° C., taking the mixture out and quenching, and obtaining the carrier material $TiO_{2-z}$ (0<z<2) through post-treatments; and
    impregnating the carrier material into a precursor solution of Fe or Ru with a certain amount, drying after ultrasonic mixing, obtaining an active ingredient through high-temperature hydrogen reduction or liquid phase reduction.

10. The method of claim 9, further comprising:
    impregnating the obtained active ingredient into an promoter solution so as to obtain the catalyst after drying in an oxygen-free atmosphere or in vacuum.

* * * * *